United States Patent [19]

Van De Sype

[11] Patent Number: 5,042,547

[45] Date of Patent: Aug. 27, 1991

[54] PORTABLE TUBELESS TIRE INFLATOR

[76] Inventor: Marcel R. Van De Sype, Box 328, Radville, Saskatchewan, Canada, S0C 2G0

[21] Appl. No.: 602,667

[22] Filed: Oct. 24, 1990

[51] Int. Cl.⁵ .............................................. B60C 25/06
[52] U.S. Cl. .................................................. 157/1.1
[58] Field of Search ................. 157/1, 1.1, 1.2; 222/3, 222/631

[56] References Cited

U.S. PATENT DOCUMENTS

| | | | |
|---|---|---|---|
| 3,677,320 | 7/1972 | Corless | 157/1.1 |
| 3,814,163 | 6/1974 | Charles et al. | 157/1.1 |
| 3,866,654 | 2/1975 | Duquesne | 157/1.1 |

*Primary Examiner*—James G. Smith

[57] ABSTRACT

A method and apparatus for bead setting and inflating tubeless tires on a vehicle wheel is provided. The apparatus for seating a loosely mounted tire ont he rim of the wheel comprises a compressed air tank, a support for the tank including rim engaging saddles slidably mounted on arms which ae releasably connected to the support body. Air from the tank passes out through a fast acting valve to an exhaust manifold to flexible lines and to nozzles mounted on the saddles to ensure the air is directed at the most efficient angle to the inside of the tire to expand it and force a seating of the beads. A main compressed air tank is used in conjunction with the bead seating air tank to supply air thereto and to simultaneously and subsequently supply air to the tire through a conventional tire stem to inflate the tire to the desired level.

19 Claims, 2 Drawing Sheets

PORTABLE TUBELESS TIRE INFLATOR

The present invention relates to tire bead seaters and more particularly to those useable for various tire sizes including very large tractor or combine tires.

BACKGROUND OF INVENTION

With the advent of the tubeless tire came the problem of quickly mounting them on a wheel rim so they could be properly inflated to carry out their normal function. The problem exists primarily because the sidewalls of the tire when installed on the rim are semicollapsed and therefore do not form an air tight chamber with the rim for normal inflation.

Various types of devices evolved to combat this problem. A band encircling the tread whereby the sidewalls were bulged out to meet the rim, though inexpensive, was not entirely satisfactory. Later made devices comprising annular tubes or circular arcs with multi-orifices were placed on the tire between the tire and rim and supplied with high pressure air to force the tire wall out so the bead would engage the rim. These also had their shortcomings in that they were not entirely versatile especially those that were in combination with a conventional tire changing machine or those which were limited to only a few sizes of tires. One further method of bead seating for tractor tires in use today, though not recommended, is to spray ether in the collapsed tire on the rim and light it. The ignition of the vapour forces the sidewalls with attached bead to engage and seat on the mounting rim of the wheel.

A search of the prior art has revealed several patents of various types, the most closely related being U.S. Pat. Nos. 3,677,320, 3,814,163 and 3,866,654. Reviewing U.S. Pat. No. 3,677,320 it will be seen that it is designed for use with a large tractor tire and is comprised mainly of an annular tube with orifices held in operative position by a large stand. Applicants portable device with compressed air tank, ball valve and adjustable saddles releasably mounts on large tractor rims, combine rims or small car rims in the vertical or horizontal position. A review of U.S. Pat. No. 3,814,163 reveals a pair of oppositely disposed segments with orifice means interconnected by a telescoping tubular structure for different tire sizes. While this device will handle tires with some variation in size it is obvious that tires smaller or larger to any significant degree than those with the arc radius of the segment will not be properly supplied with air as readily seen by a comparison with U.S. Pat. No. 3,677,320. Applicants device does not have this problem since the compressed air supply with ball valve, and adjustable saddles with nozzles provides adequate high pressure air for the larger tractor tires as well as the small car tires. A review of U.S. Pat. No. 3,866,654 leaves some doubt as to its effectiveness if only one nozzle were to be used. The use of such a device with no support for three or four nozzles is only conjecture and the resistance to air flow seen by the torturous path would be totally unacceptable in very large tires. Applicants low resistance high speed air flow using an attached compressed air tank, ball valve release, accurate nozzle flow and adjustable saddle support present a far superior, efficient device.

SUMMARY OF THE INVENTION

The present invention is used for the seating of the beads of a tubeless tire on the rim of a wheel of a vehicle. When a tubeless tire is mounted on a wheel rim the beads of the tire rarely engage the bead seats of the rim making seating and subsequent inflation of the tire almost impossible. To obviate this problem applicant has provided a portable bead seater to seat the tire beads and when used in conjunction with a primary source of compressed air will simultaneously and/or subsequently inflate the tire to the desired pressure.

Applicants portable bead seater is comprised of a compressed air tank, a tank support including arms with slidable saddles to engage the tire rim and means conveying air from the air tank to the inside cavity of a loosely mounted tire on a wheel rim. The air conveying means comprising in series a quick release ball valve mounted on the air tank, an exhaust manifold mounted on the ball valve, flexible air hose means connected to the manifold and fastened to air nozzles mounted on the saddles to ensure accurate placement of the air in the tire cavity.

With the above summary in mind it is readily discernible that the following objects are readily attainable.

It is a primary object of the instant invention to provide a light weight portable tire bead seater.

It is a further object of the present invention to provide a tire bead seater that is extremely versatile due to its adjustability and removeability of the various components.

It is a further object of the present invention to provide an inexpensive tire bead seater due to ease of manufacture and simplicty of design.

It is yet another object of the present invention to provide a tire bead seater in combination with a conventional primary source of compressed air to seat a tire bead and simultaneously and/or subsequently inflate it to a desired pressure.

Other objects and a fuller understanding of applicants invention will be had by referring to the following detailed description and drawings wherein like reference numerals will indicate like elements throughout.

IN THE DRAWINGS

FIG. 1. is a perspective view of the portable bead seater with attached main compressed air supply.

FIG. 2. is a partial sectioned elevation of a tire loosely mounted on a rim in preparation for receiving pressurized air in the tire cavity.

FIG. 3. is a more detailed perspective view of an adjustable saddle with attached nozzle.

DETAILED DESCRIPTION

Figure 1:
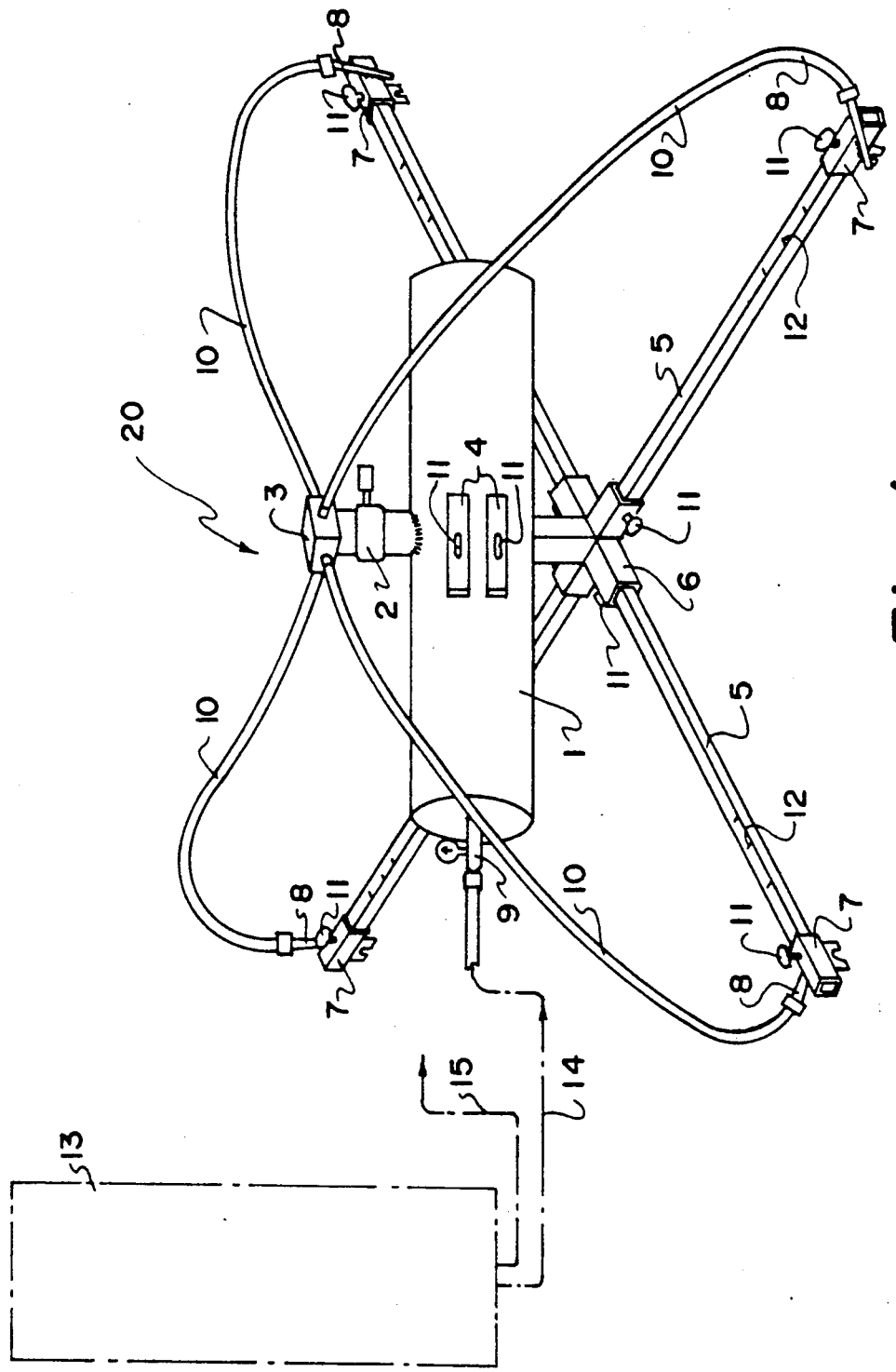

Referring now to the drawings we have in FIG. 1 a primary conventional compressed air supply 13 which may be found in a garage, tire shop or portably mounted on a truck for off-road applications. This supply 13 has an outlet 15 which can be applied to a tire valve to inflate a pneumatic tire and an outlet 14 which supplies a secondary compressed air tank 1 at inlet 9 of the portable bead seater 20. The bead seater 20 is designed to be mounted on the rim of a wheel which may vary in position from horizontal to vertical. The compressed air tank 1 is supported by a support body 6, releasable arms 5 attached to said body by thumb screws 11 and, saddles 7 engaging the wheel rim 18 (FIG. 2) and slidably positioned on arms 5 and fixed by thumb screws 11. Indicia 12 has been placed on the arms 5 to enable a fast adjustment of the saddles 7 as required by the size of the rim to be engaged. Compressed air from tank 1 is almost instantaneously released into the tire cavity by using a ball valve 2 mounted thereon. After leaving the ball valve 2 the air enters a manifold 3, from there it passes to flexible conductor lines 10 and on to air nozzles 8. The air nozzles are attached at a specific angle to the saddle 7 so that most efficient use is made of the air. Radial arm storage holders 4 are attached to the side of the air tank 1 for space saving in packaging and/or storing.

Figure 2:
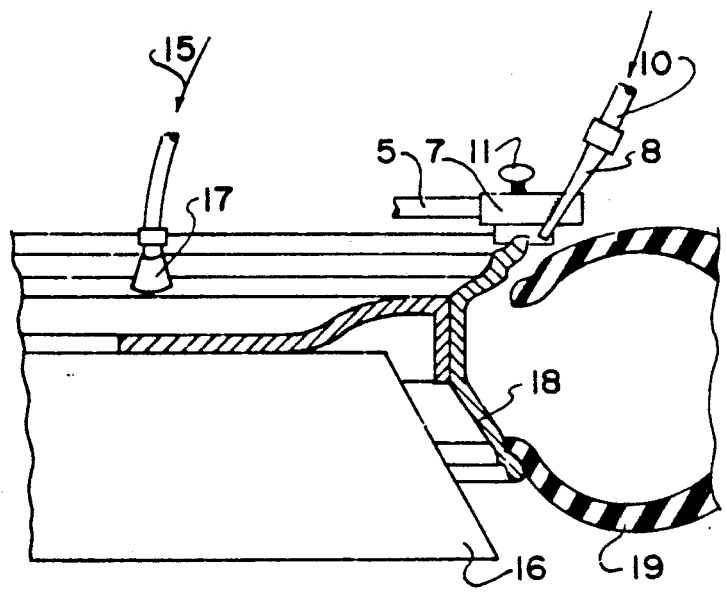

For a more detailed view of the compressed air being applied to the tire we now refer to FIG. 2 which shows a tire 19 loosely mounted on a wheel rim 18 and held up by a support 16 so that one of the tire beads may rest upon a rim bead seat. The tire 19 being loosely mounted leaves an air gap between the rim 18 and tire 19 at the other bead seat. The compressed air from the nozzle 8 is accurately directed into this space rapidly filling the inside cavity of tire 19. The saddle 7 with nozzle 8 may be adjusted along arm 5 to engage various sizes of rims 18. Air from the primary supply 13 may simultaneously and/or subsequently supply compressed air to the tire cavity by a flexible conduit 15 releasably attached to a tire stem 17.

Figure 3:
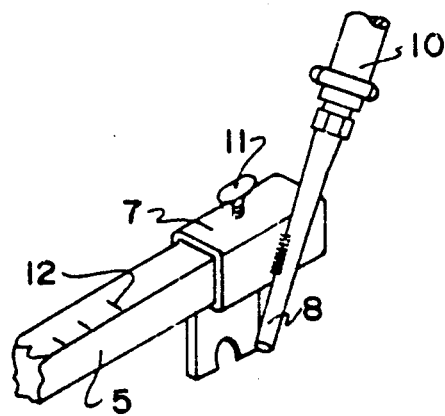

Referring now to FIG. 3 we have in more detail the flexible conduit 10 clamped to nozzle 8 which has been welded to saddle 7 which has a rim engaging notch. A thumb screw 11 fixedly holds saddle 7 when slidably positioned on arm 5 at a desirable location easily determined by indicia 12.

OPERATION

To more fully appreciate applicants invention two practical applications of the apparatus will now be discussed. The first application will be an in-field operation where a tractor or combine tire must be inflated. This will normally take place in a vertical position with the vehicle jacked up for support. The maintenance truck will have a primary compressed air source 13 on board. A supply line 14 will be connected to and fill the secondary compressed air tank 1. A second supply line 15 will be connected to the tire valve. The tire will be forced to one side of the wheel rim seating that tire bead on the wheel rim bead seat. The portable bead seater 20 is then hung on the free rim edge by the saddles 7 with the nozzles 8 directed at the space between the tire and rim. A sudden opening of the ball valve 2 releases air into manifold 3 along flexible conduits 10 through nozzles 8 and into the tire cavity forcing the remaining tire bead to seat on the rim bead seat. The supply line 15 will simultaneously and/or subsequently inflate the tire to a desired pressure.

The second application is for a normally smaller tire such as a car or truck which would normally take place in the shop. The wheel with rim and loosely mounted tire is normally placed on a horizontal support 16 so that the weight of the tire causes an engagement of the lower tire bead with the lower rim bead seat leaving a grap between the top rim bead seat and tire bead (FIG. 2). The saddles 7 of the portable bead seater 20 are adjusted to the proper location for the rim size and then the bead seater is engageably mounted on the rim 18.

A primary source of air 13 normally available in any tire shop or garage is connected by line 14 to the air tank 1 filling it to the required pressure. A second line 15 from the primary air source 13 carries pressurized air to a tire valve stem 17 mounted in the rim of the tire wheel. To seat and inflate the tire, ball valve 2 is now quickly opened releasing compressed air to the manifold 3 hoses 10 and nozzles 8. Compressed air through line 15 is simultaneously or subsequently applied to the tire cavity to assist the nozzles and/or complete the inflation of the tire.

Although the invention has been described with a certain degree of particularity it is understood that the present disclosure has been made only by way of example and that numerous changes in the details of construction and the combination and arrangement of parts may be resorted to without departing from the spirit and scope of the invention as hereinafter claimed.

I claim:

1. Apparatus for use in seating the beads of a tubeless tire loosely mounted on the rim of a wheel comprising in combination, a compressed air tank support, one or more radial arms attached to said air tank support, a compressed air tank mounted on said air tank support, outlet valve means mounted on said compressed air tank, an air exhaust manifold connected to said outlet valve means, one or more adjustable rim saddles mounted on the radial arms, an air nozzle mounted on one or more of the rim saddles, flexible air hose means connecting each of said air nozzles with the air exhaust manifold, whereby the apparatus, when saddle mounted on the rim and the outlet valve quickly opened, will direct compressed air inside the tire forcing the seating of the beads on the rim.

2. The apparatus as claimed in claim 1 wherein said outlet valve means is a ball valve.

3. The apparatus as claimed in claim 2 wherein said rim saddles are slidably positioned on the radial arms and held in a fixed desired location by means of a thumb screw.

4. The apparatus as claimed in claim 3 wherein said compressed air tank support includes sockets fitted with thumb screws to releasably attach said radial arms.

5. The apparatus as claimed in claim 4 further including indicia on said radial arms to correspond to rim sizes to aid in the rapid location of the rim saddles.

6. The apparatus as claimed in claim 5 further including air inlet means with gauge to enable recharging of the compressed air tank.

7. The apparatus as claimed in claim 6 further including radial arm storage holders fixed to the side of said compressed air tank to facilitate shipping or storage, the radial arms being held in such a location by thumb screws.

8. Portable bead seating apparatus used in the process of inflating a tire loosely disposed in the rim of a wheel comprising, a source of compressed air, support means for said source of compressed air, arms attached to said support means, air discharge mean slidably supported along said arms, air conveyance means carrying the compressed air from the source to said air discharge means.

9. Bead seating apparatus as claimed in claim 8 wherein the air conveyance means includes a ball valve for instantaneous air release, the arms are radially disposed and releaseably attached to said support means.

10. Bead seating apparatus as claimed in claim 9 wherein the air conveyance means further includes flexible conduit lines carrying the air from the ball valve to the air discharge means which are in the form of nozzles.

11. Apparatus for inflating a tubeless tire loosely mounted on a vehicle wheel including a rim with bead seats and a conventional tire valve comprising, a primary compressed air source, a secondary compressed air source, first air flow means releasably connecting said primary compressed air source to said tire valve, means supporting said secondary compressed air source on said rim, second air flow means extending from said secondary compressed air source and terminating a tire cavity access area between the loosely mounted tire bead and rim bead seat and third air flow means releasably connecting said primary compressed air source and said secondary compressed air source, whereby upon a sudden release of the secondary compressed air through the second air flow means and a simultaneous and subsequent flow of air through the first air flow means to the tire valve will seat and inflate said tire on said rim.

12. Apparatus as claimed in claim 11 wherein said second air flow means includes a ball valve for sudden release of said secondary compressed air source.

13. Apparatus as claimed in claim 11 wherein said secondary compressed air source supporting means includes arms with rim engaging saddles slidably mounted thereon.

14. Apparatus as claimed in claim 12 wherein said secondary compressed air source supporting means includes arms with rim engaging saddles slidably mounted thereon.

15. Apparatus as claimed in claim 14 wherein said second air flow means further includes an exhaust manifold mounted on said ball valve and feeding two or more flexible air conduits.

16. Apparatus as claimed in claim 15 wherein said second air flow means further includes a nozzle on the distal end of each of the flexible air conduits.

17. Apparatus as claimed in claim 16 wherein the said nozzles are integrally attached to said rim engaging saddles.

18. Apparatus as claimed in claim 17 wherein the said arms are releasably attached at their proximal end as part of the secondary compressed air supporting means by thumb screws and said slidable rim engaging saddles are also fixedly located by thumb screws.

19. Apparatus as claimed in claim 18 further including storage supports mounted on the secondary compressed air source for the said arms, and indicia on said arms to facilitate desired saddle location.

* * * * *